United States Patent [19]
Hess

[11] Patent Number: 5,581,033
[45] Date of Patent: Dec. 3, 1996

[54] UNIVERSAL INSTRUMENT PROTECTION BOX

[76] Inventor: Martin Hess, Kiliansplatz 2, D-80339 Muenchen, Germany

[21] Appl. No.: 394,593

[22] Filed: Feb. 27, 1995

[51] Int. Cl.⁶ ........................................... G01P 1/02
[52] U.S. Cl. ............................................. 73/431
[58] Field of Search ................ 73/431, 201, 756, 73/886.5; 220/4.21–4.24, 4.26, 262, 281, 287, 306, 307, 601, 661, 677, 681, 682; 206/459.1, 485

[56] References Cited

U.S. PATENT DOCUMENTS

| | | | |
|---|---|---|---|
| 2,720,332 | 10/1955 | Holt | 220/4.24 |
| 2,816,686 | 12/1957 | Bradford | 220/681 |
| 2,907,492 | 10/1959 | Robertson | 220/681 |
| 3,384,228 | 5/1968 | Lannon | 206/485 |
| 3,519,162 | 7/1970 | Peterson et al. | 220/4.21 |
| 4,399,927 | 8/1983 | Yaotani et al. | 220/307 |
| 4,597,291 | 7/1986 | Motomiya | 73/431 |
| 4,809,548 | 3/1989 | Rivero-Olmedo | 73/201 |
| 5,253,753 | 10/1993 | Brownfield | 220/4.24 |

FOREIGN PATENT DOCUMENTS

| | | | |
|---|---|---|---|
| 646958 | 11/1928 | France | 220/681 |
| 843711 | 7/1952 | Germany . | |
| 2946281A1 | 12/1980 | Germany . | |
| 0268742A1 | 7/1987 | Germany . | |
| 3704015A1 | 8/1988 | Germany . | |
| 4203300A1 | 8/1993 | Germany . | |
| 4305439A1 | 8/1994 | Germany . | |

OTHER PUBLICATIONS

IBM Technical Disclosure Bulletin vol. 35 No. 1B Jun. 1992 p. 122.

*Primary Examiner*—Robert Raevis
*Attorney, Agent, or Firm*—Cort Flint

[57] ABSTRACT

The instant invention relates to a protection box to be installed on a measuring instrument assembly in a process plant. The box includes two identical box halves in contact with each other, about contact rims. Opposing recesses are provided at the interfaces of the contact rims to form passage openings when the halves are closed. According to the invention the passage openings are of sufficient sized so that the usual elements of the measuring instrument assembly extending through the protection box walls fit with excess space. The passage openings are tightly sealed by an inserted molded plug made of an elastic foam material. Passages for the parts of the measuring instrument assembly entering or exiting the protection box can be installed at the installation site in such manner that said parts are tightly enclosed under tension by the elastic synthetic material of the molded plug. Universal application of the protection box and proper functioning as well as easy handling are achieved.

27 Claims, 4 Drawing Sheets

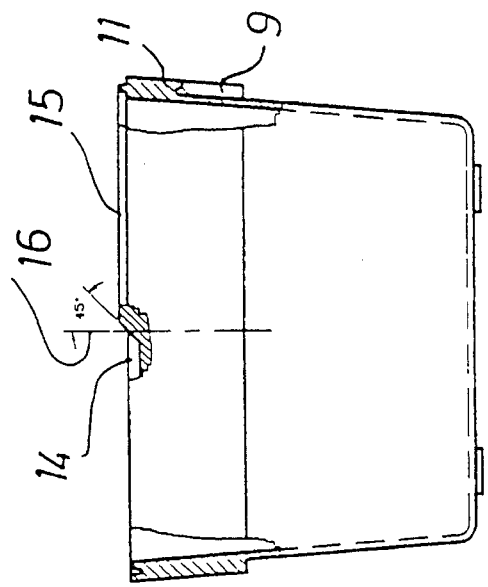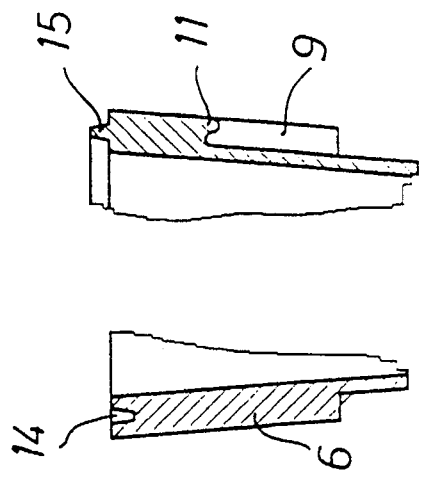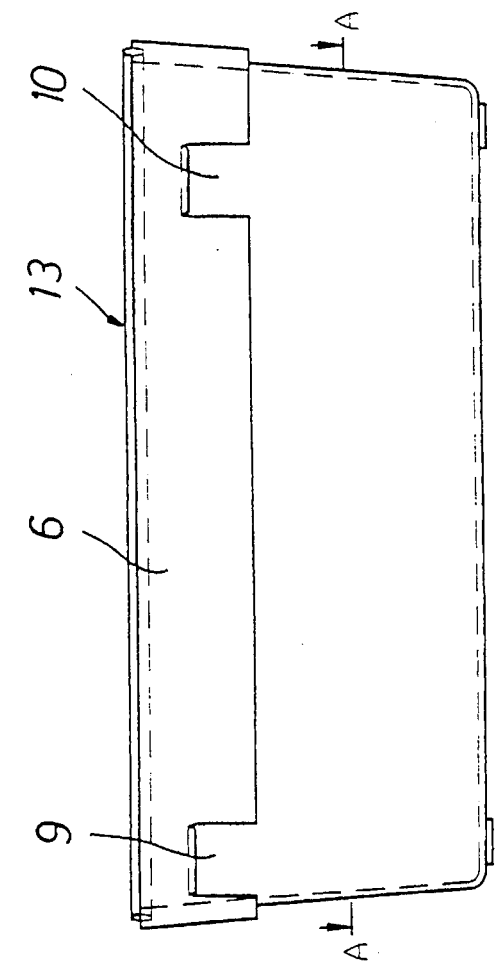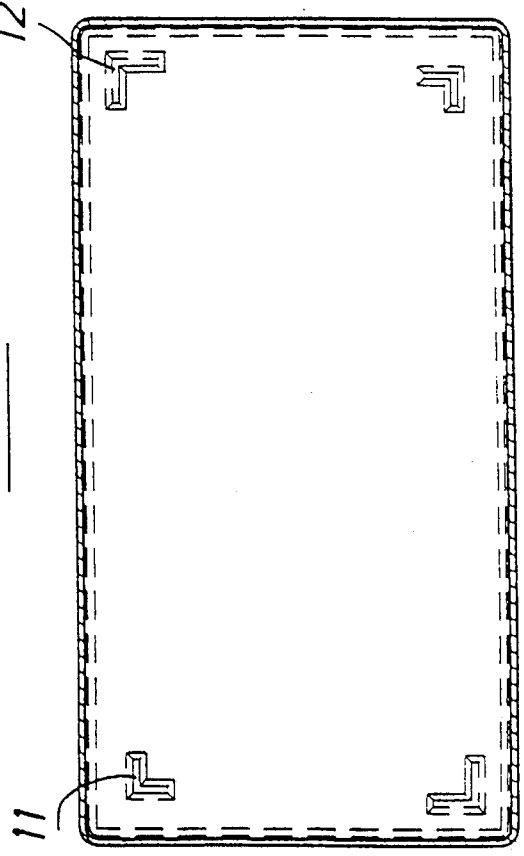

UNIVERSAL INSTRUMENT PROTECTION BOX

BACKGROUND OF THE INVENTION

The invention relates to a protection box for a measuring instrument assembly as used in a process plant and, more particularly, to a tight, sealable reception of part of the measuring instrument assembly in at least one wall of the protection box.

In chemical and refining plants measuring instruments used in the field such as measuring transducers for example, are usually enclosed in protective housings made of a synthetic material. The housing protects the instruments from climatic influences and aggressive substances to ensure its operation and long life. Furthermore these protective housings are provided with heat barriers and heating elements, depending on requirements and circumstances.

Prior protective housings are known in a great number of designs. Current designs consist of a box-shaped part open on one side and of a cover which is placed over the first part in the manner of a hat with intercalation of seals and is attached with quick-acting closures. In another known embodiment (DE 37 04 015 A1) a box-shaped protective housing is divided into two housing parts along the diagonal of the lateral surfaces.

These relatively large protective housings are fixedly mounted on supports in a permanent, immovable manner, and instruments are then placed in them as required. For this purpose holding devices such as C-rail arrangements are provided on which the instruments are mounted. Entrances and exits for process lines and cables are installed individually, and care must be taken for proper installation and sealing. In these known protective housings the installed instruments are thus fixedly connected to a housing part. The housing part is in turn connected in a stable manner to a bearing structure. Attaching such protective housings, and, in particular when installing a measuring instrument assembly after mounting of the protective housing involves considerable assembly work and is accordingly expensive.

Protection boxes of this type to be mounted and held directly at a measuring instrument installation in a process plant, in particular for rapid mounting an already existing measuring instrument assembly are known. These relatively small protection boxes enclose the measuring instrument equipment rather tightly, by contrast to the large protective housings mentioned earlier, and are suited for repeated, tight sealing of at least part of the measuring instrument equipment.

A protection box of this type consists of two box parts in form of half shells made of a solid wall material. The half shells are being connected to each other by latch elements at side rims used as contact rims. The open sides of the half shelf fit together and can be taken apart. Recesses which are open towards the contact rim are provided in the area of one contact rim. These recesses are closed by the fitted second half shell, and possibly by corresponding assigned additional recesses at the adjoining box side of the second half shell, to define a passage opening. The half shells can therefore be placed from both sides on an existing measuring instrument assembly and can be closed. Part of the measuring instrument assembly may be extended through the passage openings in a flow-through arrangement.

A method of enclosing a measuring instrument assembly in a flow-through arrangement with a protection box is known. In that method, a medium-loaded differential pressure measuring cell is surrounded by the two halves of the protection box so that a measuring head emerges from a tailored passage opening of the protection box and where two process lines go into the protection box through separate, tailored passage openings. The measuring instrument assembly is installed in the protection box and is held mechanically.

The installation of such a protection box merely by placement and connection of the two half shells on the measuring instrument assembly works well, is simple and economical. However, the multiplicity of different instruments and different geometries of connections and lines presents a problem. A plurality of different box designs with different slits and opening arrangements for passages with different diameters and in different sizes must be provided. This causes manufacture, due to a plurality of production forms, as well as warehousing, transportation and logistics to be expensive. The advantage of easy installation becomes only a relative advantage.

A further disadvantage of these known protection boxes consists in the fact that as a rule either leaky gaps remain open at the passage openings due to an inaccurate fitting, or that the openings must be sealed manually through individual, expensive measures. The gap between two process lines remains open for example if two half shells with slits are fitted from both sides over the process lines.

Because it is necessary to take into account the variety of equipment in measuring instrument assemblies it is not uniformly possible to produce all box parts in form of economic identical parts so that uniform, volume-saving stacking of one in the other is also impossible.

Another disadvantage may also consist, depending on the application, in that the two box shells can be attached on the measuring instrument assembly only as separate, and not permanently, connected shells. The shells must be removed completely in two parts and must be mounted again upon completion of work when performing maintenance or servicing. This renders handling more difficult. The known connection of the two box parts by means of holding bands is also expensive and inconvenient.

Accordingly, an object of the instant invention is to provide a protection box in such manner that more economic production and handling is possible while its function is improved.

SUMMARY OF THE INVENTION

The above objectives are accomplished according to the present invention by providing a protection box having mechanically solid and stable box parts with sidewall recesses defining passage openings of a sufficient size so that parts of the measuring instrument assembly which normally extend through the protection box sidewall can be received with excess space. Molded plugs made of an elastic synthetic material are inserted in the passage opening(s) for tight sealing. At the same time the measuring instrument parts extend through the plugs sealed in the protection box in such manner that these parts are tightly sealed under tension by the elastic foam material when the box halves are fitted together.

Thus, a universal protection box suitable for most conventional measuring instrument assemblies is created. The conditions at the installation site are taken into account through easily made passages in the molded plugs. Process lines for example can be pushed through the molded plugs rapidly and easily without need for additional tools. Disadvantageous open gaps leading to the inside of the protection box are eliminated by the elasticity of the foam material of the plugs. When the protection box is opened or detached for maintenance or servicing, the molded plugs can remain in place on the measuring instrument assembly. As the box parts are again installed and closed, the molded plugs are again inserted sealingly into the adjoining sides of the box halves.

In accordance with the invention, permanent operational tightness of the protection box is ensured, together with easy, rapid and inexpensive handling during first-time installation as well as for later maintenance work. Recesses and/or passage openings are identical in manufacture, delivery and storage of the stable box parts so that a multiplicity of box part embodiments is avoided. Adaptation to the conditions of the installation site is possible by individual and simple making of passages in a standard molded plug. However, designed molded plugs are possible, taking into account repetitive arrangements with passages. When different designs are taken into account in different molded plugs, this is considerably less expensive than to make different box parts. Furthermore tightness is improved in every instance with the molded plugs due to tight sealing.

In one embodiment of a protection box with two separate passage openings, process lines extend through one passage opening and a measuring head extends through another passage opening, when installed.

An especially advantageous design of a protection box includes two identical, trough-shaped box halves, preferably made of glass fiber reinforced polyester, which are in contact with each other via contact rims around their open sides. Such trough-shaped box halves are identical parts which are inexpensive in manufacture and which can be easily stacked within each other due to their conical side surfaces.

The passage defining recesses are made in form of semi-circles so that a circular passage opening is formed at an interface between the two box halves when closed together. For this purpose, a diameter of approximately 100 mm is advantageously selected, allowing conventional measuring instruments to be accommodated. In principle however, other configurations of passage openings with correspondingly formed sealing plug configurations are also possible.

To ensure a tight seal and stable connection between the two box halves, a groove and tongue arrangement may be provided at the contact rims. In this case half of a surrounding contact rim on one box half is made in form of a groove, and the other half is made in form of a tongue, so that the two box halves can be identical parts.

If a rubber seal is used in the groove and tongue arrangement, it is advantageous to make the transition from groove to tongue at an angle, e.g. at an angle of 45°, and to provide larger dimensions for the depth of the groove, than for the height of the tongue. This avoids crushing of the rubber seal.

Stacking corners and stacking rims can be formed in a known manner by protruding elements in order to improve stacking and in particular to render stacks more secure and to improve support.

An advantageous design of a sealing plug, the plug is made as one-piece and preferably of sponge rubber, larger than the diameter of an associated passage opening. However, the sealing plug inserted into a passage opening can also be made in several parts, if necessary. The parts may be pressed and held tightly together by the surrounding opening rims of the box halves.

Stable clamping in the passage opening and a tight seal are created, in particular, if the sealing plug is round as a circle and provided with a surrounding groove. In this case the groove of the sealing plug should preferably taper conically towards the bottom of the groove. When the recessed contact rims of the box open sides enter into the plug groove during installation, and are clamped around the groove bottom, the resilient groove surface is pushed against the recessed rims with a pre-stress to ensure a good seal.

The connection of heat insulation of the process lines on the mounting side of the protection box constitutes a problem because normally gaps remain in the contact area. To improve this, a slightly conical and truncated form of the sealing plug is provided having a plug projection extending to the outside on which corresponding heat insulation can be installed. In this connection it is again pointed out that the molded plugs can remain in place on the measuring instrument assembly as the protection box is opened or removed, providing the advantage that the heat insulation connected to the molded bodies need not be removed.

For protection against environmental influences and in order to extend its life, the sealing plug is made by a known manufacturing process using a foamed material with an all-enclosing skin.

For improved handling, the two box halves are to be connected to each other by hinges so that they can be opened, and closed with quick acting closures.

In the embodiments described so far the measuring instrument assembly is installed and held in the box by the sealing plugs applied directly against the assembly. This is sufficient with suitable dimensions of foamed material that is not too soft and where boxes are relatively small for a number of different applications. For an improved support of the measuring instrument assembly in the box, a stable, inside holder may be provided projecting inward into the containing space which is attached to at least one box half. In particular to a hinge element of the box halves. This attachment can be effected by known means such as screwing, gluing, welding, etc. This inside holder can be connected directly to the measuring instrument assembly, e.g. to process lines, whereby the box parts are then supported directly above and the elastic sealing plugs in the passage openings are relieved.

Since a protection box according to the invention is relatively small and thereby of advantageous weight, no problems of strength exist as a rule if the box halves are installed directly on the measuring instrument assembly, without any further supports. If this should cause problems with long, unsupported process lines due to the weight of the box, a stable outside holder similar to the inside holder can easily be attached to at least one box half. By combining the outside holder to an appropriate support, the protection box is thereby supported in a cantilevered fashion. With a combination of inside holder and outside holder the measuring instrument assembly is furthermore supported, with a force exerted by the inside holder to the protection box and from there via the outside holder to the support.

An especially advantageous design of an inside holder and/or outside holder includes a eyelet which can be placed on an extended hinge axle, in particular, on an axle going through and connecting two hinges. If necessary, such holders can thus be installed and used quickly and easily. Adaptation and adjustment for attachment to the measuring instrument assembly, or to a support, is ensured by a displacement path provided alongside a hinge axle which goes all the way through. For attachment to a measuring instrument assembly two attachment plates which can be clamped together in transversal direction are provided on the free end of the inside holder.

The protection box can be provided in a known manner with a heat insulation, whereby the tight seal to the outside via the molded plugs improves heat insulation overall. Internal heating of the protection box can be ensured by means of a warm process medium or by means of heating element used as an outside heating system.

DESCRIPTION Of THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 2 shows a side view of the long side of a box half;

FIG. 3 shows a partially cut side view of the wide side of a box half;

FIG. 4 shows a top view of a box half along section line A—A from FIG. 2;

FIG. 5 shows an enlarged representation of the border design according to FIG. 3;

DESCRIPTION OF A PREFERRED EMBODIMENT

Figure 1:
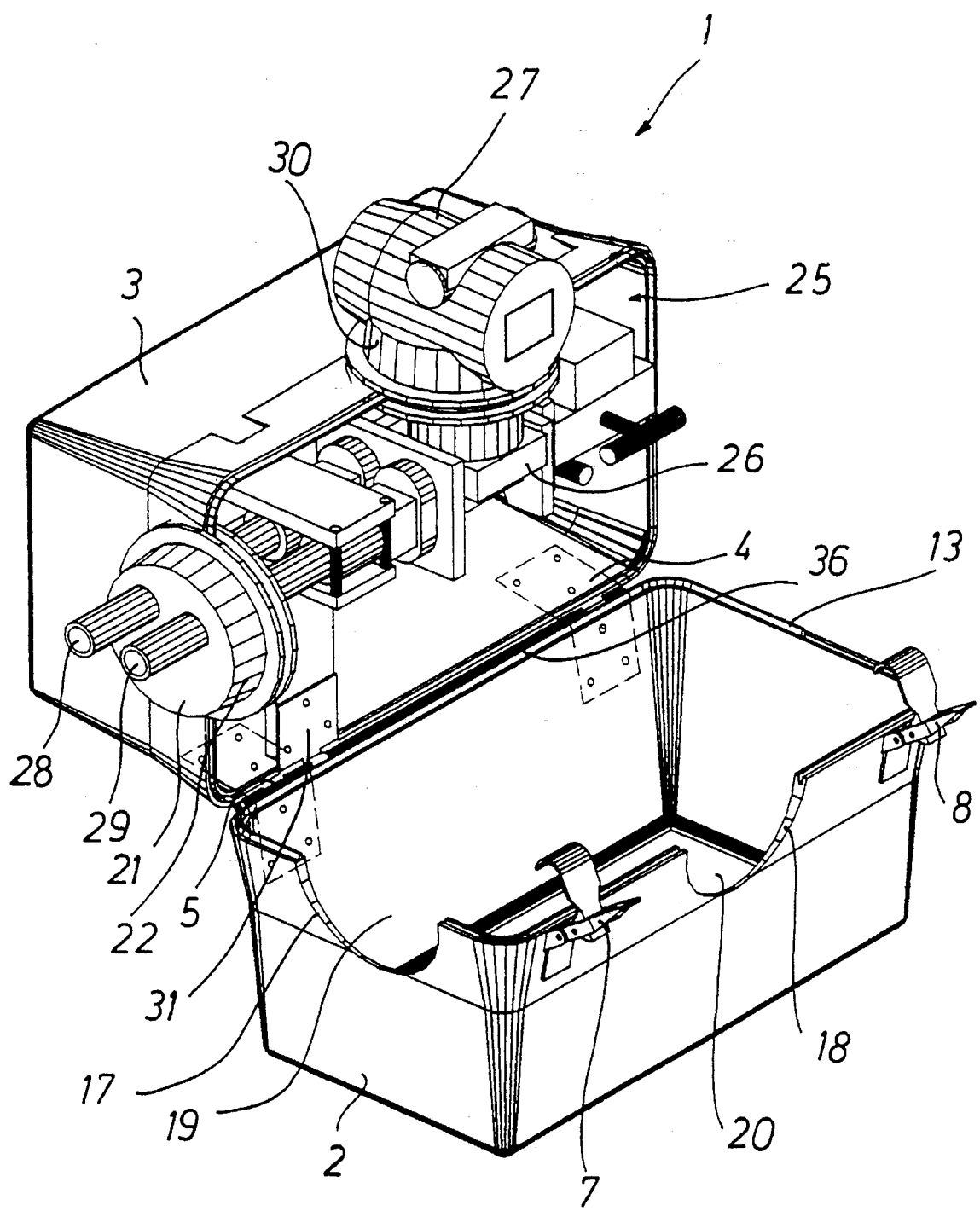
FIG. 1 shows an open protection box in its assembled state.

Referring now to the drawings, the invention will now be described in more detail.

In FIG. 1, an installed protection box 1 is shown, consisting of two identical, trough-shaped box halves 2, 3 which are connected to each other at a longitudinal side of their opening by hinges 4, 5 so as to be capable of pivotal movement.

The form of each box half is best explained in greater detail by reference to FIGS. 2 to 5. In these figures a box half is shown from different angles and partially in section after taken out of its mold. Because of the conically extending lateral walls it is easy to remove the halves from their molds, and the box halves can be stacked inside each other in a space-saving manner. When stacked, the box halves are supported by a surrounding reinforcement border 6. Quick-acting closures 7, 8 can be installed on this reinforcement border (FIG. 1). The reinforcement border 6 is provided with recesses 9, 10 and with an undercut hooking edge 11 to provide a catch for the hooking elements of these quick-acting closures 7, 8 (always on the opposite box half).

To stack finished protection boxes, each consisting of two box halves 2, 3 stacking corners 12a, 12b are furthermore incorporated in form of raised areas in the material into the outer surface of the box surface, offset at a diagonal to each other.

The respective side-opening, contact rims 13 is made in form of a groove-and-tongue arrangement. One half of the periphery of a contact rim on each box half is made in form of a groove 14, and the other half is made in form of a tongue 15. The transition from groove 14 to tongue 15 is at a slant, with an angle 16 of 45°.

All of the above characteristics described above through FIGS. 2 to 5 contribute, among other things, to the possibility of making the protection box in form of two box halves 2, 3 which are identical.

Furthermore, it can be seen in particular in FIG. 5 that the depth of the groove 14 is greater than the height of the tongue 15, so that a rubber seal (not shown) can also be inserted into the groove.

During manufacture of box halves 2, 3, as shown in FIGS. 2 to 5, semi-circular recesses 17, 18 are formed in the box halves. The recesses are the mirror image of the other and are formed in the area of the respective contact rim 13, either in the side walls or in the longitudinal wall across from the hinges 4, 5. When the protection box is installed and closed, these semicircular openings 17, 18 form circular passage openings 19, 20 with a diameter of 100 mm.

The two matching box halves 2, 3 may be assembled by installing the hinges 4, 5, and the quick-acting closures 7, 8 either at the manufacturing plant or at the user's facility.

Figure 6:
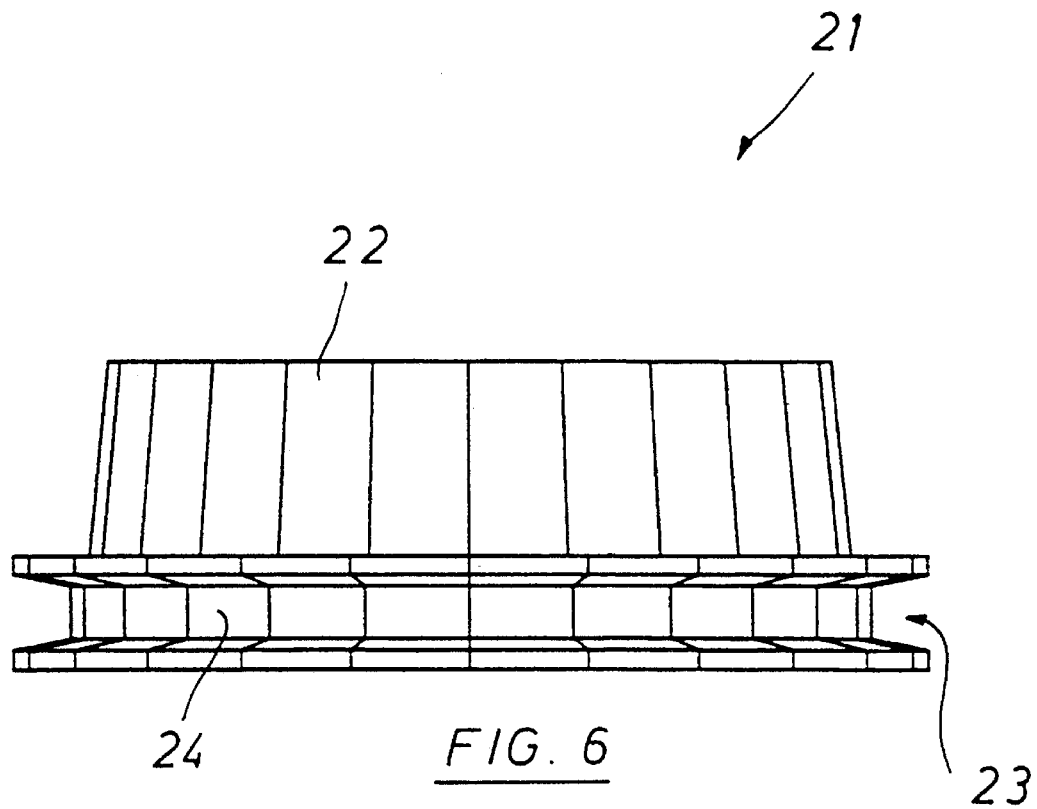
FIG. 6 shows a side view of a sealing plug made of foamed material.
Figure 7:
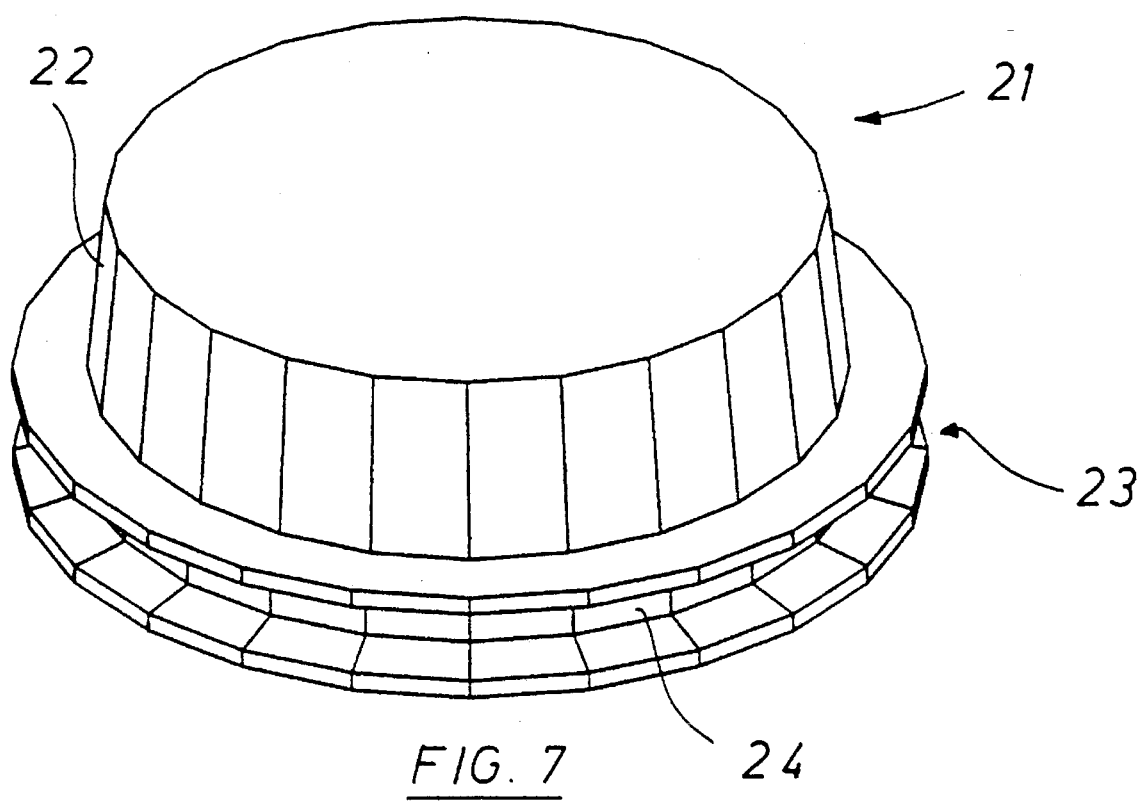
FIG. 7 shows a perspective view of the sealing plug according to FIG. 6.

To cover the circular passage openings 19, 20 circular molded plugs, preferably made as one-piece from a foam material, in particular sponge rubber, with a closed skin all around according to FIGS. 6 and 7. The molded plug is provided with a slightly conical truncated projection 22 which follows a sealing zone 23 with surrounding molded-plug groove 24. The diameter of the circle at the bottom of the groove is larger than the diameter of the passage openings 19, 20, and the molded-plug groove 24 tapers downward in direction of a groove bottom.

FIG. 1 shows a measuring instrument assembly 25 installed in a finished protection box 1 as applied to a flow-through and measuring station. The measuring instrument assembly 25 consists essentially of a differential pressure measuring cell 26 and an electronic measuring head 27 connected to same, as well as two process lines 28, 29 adjacent each other and connected to the measuring cell 26.

The process lines 28, 29 may be pushed through the material of the molded plug 21, whereby the elasticity of the foam plug ensures tight contact in the area of the passages. The connection of the measuring head 27 is equally tight due to a suitable molded plug 30.

The protection box is laid out so that the hinges 4, 5 are located on the underside and the box halves 2, 3 are closed by an upward pivoting movement. The opening contact rims of the passage openings 19, 20 enter the correspondingly sized molded-plug grooves 24 interlockingly. Due to the oversized dimension of a molded plug 21, 30 compared to the groove bottom, the diameter of the plug is reduced elastically at that location. The groove surface is moved against the lateral sides 2a, 3a of the box halves 2, 3 for tighter contact under tension. On the mounting side, heat insulation without an intermediary interval can be installed on the projection 22 of the molded plug 21 for the process lines 28, 29.

Figure 8:
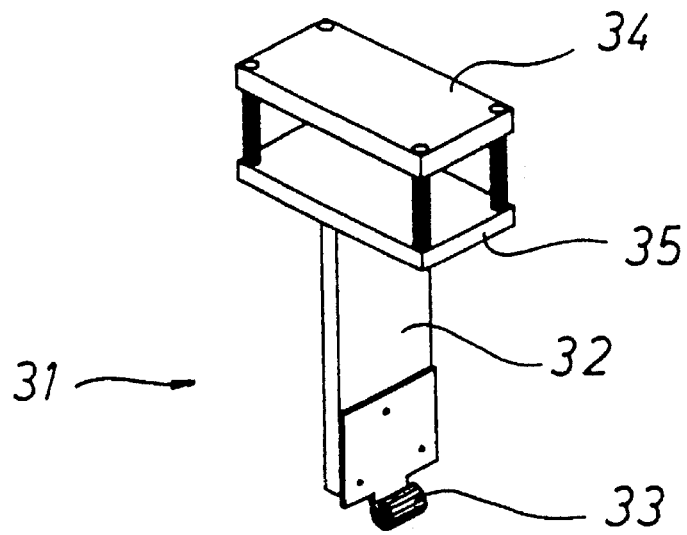
FIG. 8 shows an inside holder.

FIG. 1 also shows an inside holder 31 on the inside of the protection box. The holder serves as a support and connects the protection box 1 to the process lines 28, 29. The holder is shown separately in FIG. 8. This holder 31 consists of a bracket 32 with an eyelet 33 at one end, and an arrangement consisting of two mounting plates 34, 35 which can be clamped together transversely on the other end.

As can be seen in FIG. 1, holder 31 with eyelet 33 is placed on a hinge axle 36 which connects the two hinges 4, 5. The process lines 28, 29 are clamped between the mounting plates 34, 35. By attaching the holder 31 the molded plugs 21, 30 are relieved of the weight of instrument assembly 25, and the two box halves 2, 3 can be opened downward without falling off of the instrument assembly so as to ensure good accessibility of the measuring instrument assembly 25. The molded plugs 21, 30 remain in their position during this action.

Figure 9:
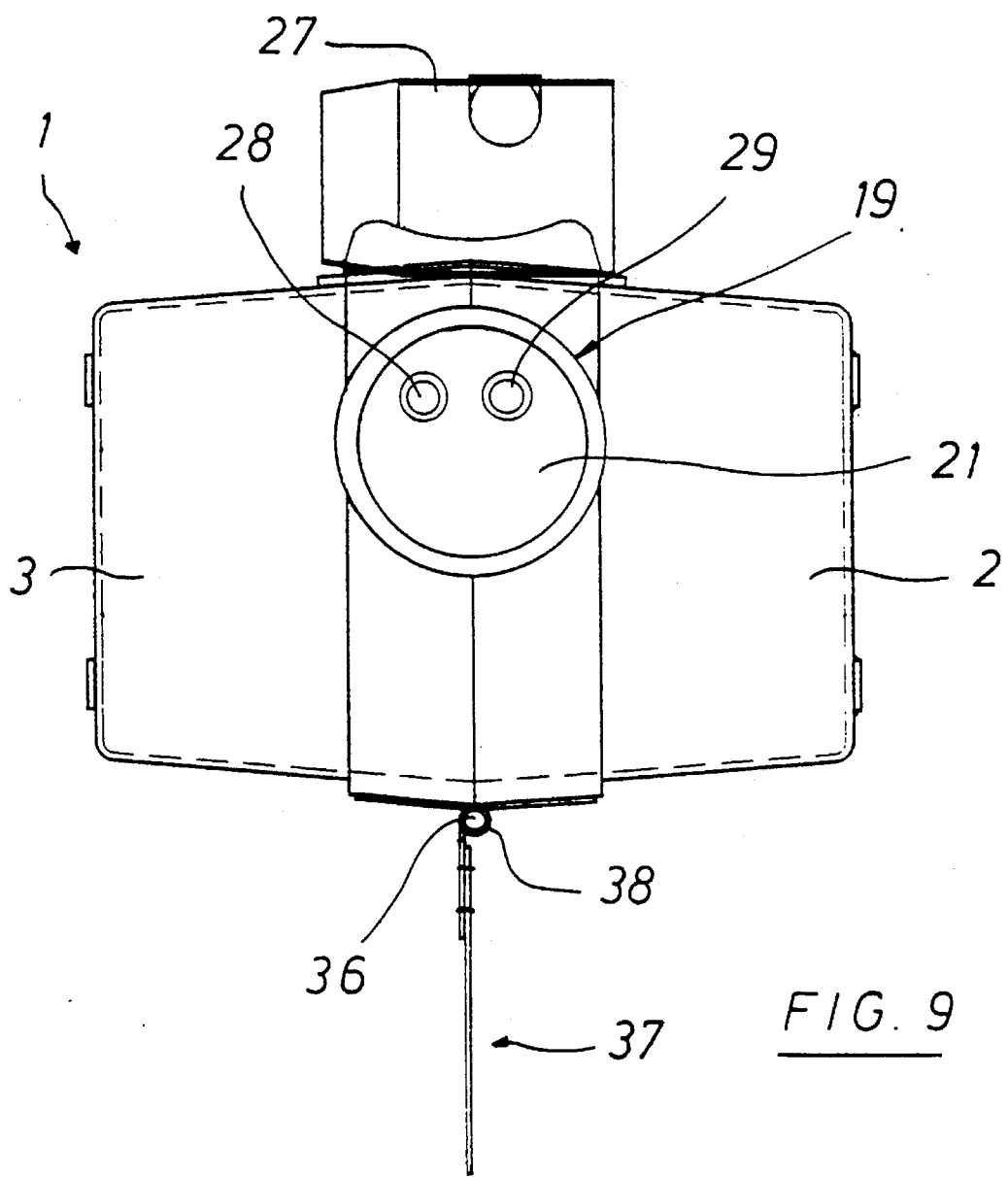
FIG. 9 shows a side view of a closed, mounted protection box with outside holder.

FIG. 9 shows the installed arrangement of the protection box in its closed state provided with a bracket-shaped outside holder 37. Holder 37 is also placed over the hinge axle 36 through an eyelet 38. Outside holder 37 can be connected to a support (not shown) for weight relief and stabilization of the arrangement consisting of the measuring instrument assembly and the protection box 1.

While a preferred embodiment of the invention has been described using specific terms, such description is for illustrative purposes only, and it is to be understood that changes and variations may be made without departing from the spirit or scope of the following claims.

What is claimed is:

1. A protection device for protecting an instrument assembly to be placed in the protection device in an industrial plant, said protection device including a protection box for receiving and sealing at least part of said instrument assembly within said protection box, said protection box including two box halves having solid box walls, a peripheral contact rim extending around the periphery of said box walls of each of said box halves, said contact rims of opposing box halves being engaged with one another when said box halves are in a closed position to define an interior box enclosure, spaced closures carried by said box walls for locking said box halves in said closed position, said box halves being movable away from each other to an open position wherein access is had to said enclosure space, at least a first recess in a box wall of a first box half formed in the area of a first contact rim which is open on the side of said first contact rim so that said recess is closed by a second contact rim of an adjoining second box half to define a passage opening for passage of a part of said instrument assembly, whereby at least part of said instrument assembly extends into said enclosure space of said protection box through said passage opening, wherein said device comprises:

said first recess formed in said wall of said first box half being open across a portion of said first contact rim;

a second recess formed in a wall of said second box half being open across a portion of said second contact rim;

a passage opening defined by surrounding edges of said first recess and said second recess adjoining and mating with one another at said portions of said first and second contact rims;

an excess space being defined in said passage opening between said part of said instrument assembly extending through said passage opening into said enclosure space of said protection box and said surrounding edges of said passage opening;

a resilient, pierceable sealing plug sealingly disposed in said passage opening and said excess space in a manner that a tight seal is formed between said surrounding edges of said passage opening and said plug, and said plug being composed of resilient material which may be pierced whereby to provide a sealing means which said instrument part punctures during insertion through said resilient material in a manner that a tight seal is formed around said instrument assembly part in situ;

whereby a passage of said instrument assembly part through said sealing plug into said protection box may be created as required at an assembly site, and said part is tightly sealed by said pierced resilient material of said plug.

2. The device of claim 1 including a second passage opening formed in said protection box at separate locations by first and second mating recesses in said first and second box halves so that process lines enter said box through one passage opening and a measuring head extends out of another passage opening.

3. The device of claim 1 wherein said box halves consist of two identical trough-shaped box halves preferably made of reinforced polymeric material which contact each other at said contact rims; and said recesses are made in the form of a semi-circle so that when the box halves are closed a circular passage opening is defined.

4. The device of claim 3 wherein said passage opening has a diameter of approximately 100 mm.

5. The device of claim 1 wherein each of said first and second contact rims include an interlocking groove-and-tongue arrangement which includes a groove formed around one-half of the periphery of each said contact rim and a tongue is formed around one-half of said periphery of each said contact rim, and a transition from said groove to said tongue is preferably slanted at a transition angle.

6. The device of claim 5 wherein said transition angle is approximately forty-five degrees.

7. The device of claim 5 wherein said groove has a depth which is greater than the height of the tongue so that a rubber seal may be disposed into said groove-and-tongue arrangement.

8. The device of claim 1 including projecting foot elements carried on a bottom of said box halves defining stacking corner edges.

9. The device of claim 1 wherein said sealing plug includes a one-piece molded plug for insertion into each said passage opening, and said molded plug has a sealing surface with a diameter larger than a diameter of said passage opening so that when said molded plug is inserted in said passage opening said sealing surface is deformed and held by surrounding edges of said passage opening.

10. The device of claim 9 wherein said sealing surface has a circular circumference, and said plug includes a molded plug groove which corresponds to the thickness of said box wall, said molded plug groove being tapered conically towards said sealing surface disposed at the bottom of said plug groove, and said surrounding edges of said passage openings interlocking tightly with walls of said molded plug groove when the protection box is closed.

11. The device of claim 10 wherein said molded plug is cylindrical, and terminates axially in a slightly conical and truncated projection for the installation of heat insulation on an exterior assembly side of said protection box.

12. The device of claim 9 wherein said molded plug is molded from a foam polymer material having a completely enclosing outer skin.

13. The device of claim 1 wherein said two box halves are connected to each other along longitudinal edges by a hinge assembly so that they may be pivoted between said closed and open positions, and said closures include quick-acting closures carried on opposite longitudinal edges of said box halves.

14. The device of claim 13 including an inside holder carried within said enclosure space projecting inward towards said enclosure space for supporting said instrument assembly in said enclosure space attached to at least one box half.

15. The device of claim 14 including an outside holder projecting outward and attached to at least one box half and adapted for connecting to an exterior support.

16. The device of claim 14 wherein at least said interior holder is attached to a hinge element of said protection box hinge assembly.

17. The device of claim 16 wherein said inside holder is provided with an eyelet which can be placed over an extended hinge axle going through and connecting at least one hinge of said protection box hinge assembly.

18. The deice of claim 17 wherein said inside holder is provided with two attachment plates which can be clamped together on a bracket to grip said instrument assembly part.

19. The device of claim 1 wherein a heating element and/or heat insulation is installed in the protection box.

20. A protection device for protecting an instrument assembly to be placed in the protection device plant comprising:

- a protection box for receiving and sealing at least an instrument part of said instrument assembly within said protection box;
- a first box half and a second box half included in said protection box;
- a first contact rim extending around a periphery of said first box half;
- a second contact rim extending around a periphery of said second box half;
- said first and second contact rims engaging one another when said first and second box halves are in a closed position;
- a passage opening defined by at least a first recess in a wall of at least one of said box halves for routing of said instrument part;
- a molded pierceable plug sealingly disposed in said passage opening having a circular sealing surface with a cross-sectional dimension larger than a corresponding cross-sectional dimension of said passage opening so that when said molded plug is inserted in said passage opening said sealing surface is deformed and sealingly gripped by surrounding edges of said passage opening to form a tight seal between said surrounding edges of said passage opening and said plug; and
- said plug being composed of resilient material whereby to provide a sealing means which may be pierced so that said instrument assembly part punctures and is inserted through said resilient material in a manner that a tight seal is formed around said instrument assembly part in situ.

21. The device of claim 20 including said first recess formed in a wall of said first box half being open across a portion of said first contact rim, a second recess formed in a wall of said second box half being open across a portion of said second contact rim; said first and second recesses being made in the form of a semi-circle to define a circular passage opening having a passage diameter when said box halves are closed, and said sealing surface having a sealing diameter constituting said cross-sectional dimension larger than said passage diameter.

22. The device of claim 21 wherein said sealing surface is circular, and said plug includes a molded plug groove which corresponds to the thickness of said box wall, said molded plug groove being tapered conically towards said sealing surface disposed at the bottom of said plug groove, and said surrounding edges of said passage openings interlock tightly with walls of said molded plug groove when the protection box is closed.

23. The device of claim 22 wherein said molded plug is cylindrical, and terminates axially in a slightly conical and truncated projection for the installation of heat insulation on an exterior assembly side of said protection box.

24. The device of claim 20 wherein each of said first and second contact rims include respective first and second interlocking groove-and-tongue arrangement which include a groove formed around one-half of the periphery of said contact rim and a tongue formed around one-half of said periphery of said contact rim, and a transition from groove to tongue is preferably slanted at a transition angle so that said first and second groove-and-tongue arrangements mate with one another.

25. The device of 24 wherein said groove has a depth which is greater than the height of the tongue so that a rubber seal may be disposed into said groove-and-tongue arrangement.

26. The device of claim 20 wherein said sealing plug consists of a one-piece molded plug.

27. The device of claim 20 including an inside holder carried within said enclosure space projecting inward towards said enclosure space for supporting said instrument assembly in said enclosure space attached to at least one box half.

* * * * *